(No Model.) 4 Sheets—Sheet 1.
G. F. CARD.
SAFETY AND LIMIT SWITCH FOR ELECTRIC MOTORS.
No. 548,949. Patented Oct. 29, 1895.

(No Model.)
4 Sheets—Sheet 2.
G. F. CARD.
SAFETY AND LIMIT SWITCH FOR ELECTRIC MOTORS.
No. 548,949. Patented Oct. 29, 1895.
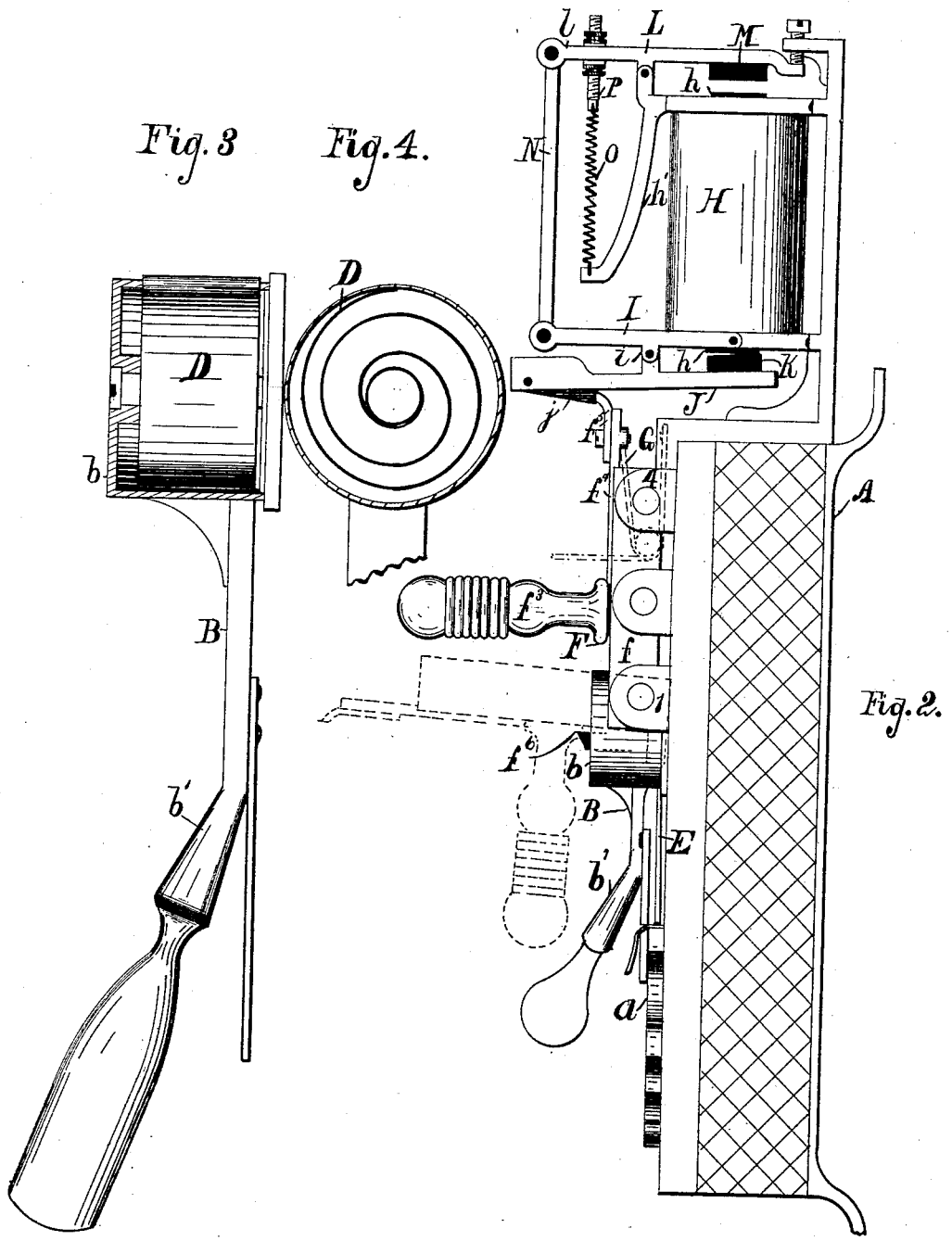
Witnesses
Ernest K. Hood.
Arthur J. George.
Inventor
George F. Card,
By his Attorney (No Model.) 4 Sheets—Sheet 3.
G. F. CARD.
SAFETY AND LIMIT SWITCH FOR ELECTRIC MOTORS.

No. 548,949. Patented Oct. 29, 1895.

Witnesses
Ernest K. Hood
Arthur E. George

Inventor
George F. Card,
By his Attorney,
Geo. B. Parkinson.

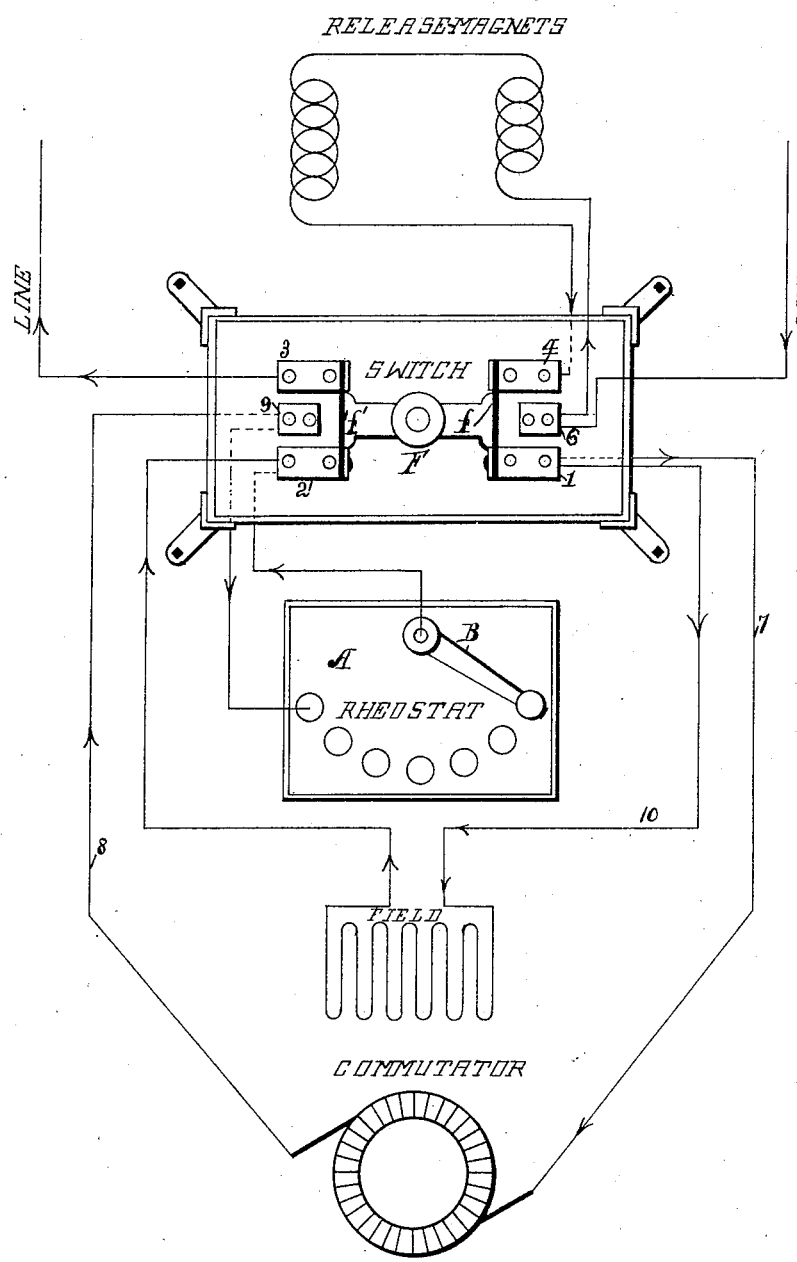

UNITED STATES PATENT OFFICE.

GEORGE F. CARD, OF MANSFIELD, OHIO.

SAFETY AND LIMIT SWITCH FOR ELECTRIC MOTORS.

SPECIFICATION forming part of Letters Patent No. 548,949, dated October 29, 1895.

Application filed August 21, 1895. Serial No. 559,993. (No model.)

*To all whom it may concern:*

Be it known that I, GEORGE F. CARD, a citizen of the United States of America, residing at Mansfield, in the county of Richland and State of Ohio, have invented certain new and useful Improvements in Safety and Limit Switches for Electric Motors, of which the following is a specification.

In systems of electrical distribution it is necessary to have some means for protecting the motor against abnormal changes of current. In starting a motor a comparatively powerful torque is necessary to make the initial movement, but if the current is turned through the motor too rapidly the wiring of the armature becomes overheated and the well-known "burn-out" is the result. Rheostats have been used to insure a gradual initial delivery of the current to the motor. This does not prevent an abnormal amount of current from passing to the motor when the current is increased in pressure beyond the limit for which the motor is designed. It also often happens that a circuit is broken and repaired or the generator stopped and started, so that the current jumps from nothing to the maximum before the motors are cut out of circuit or the rheostats set for starting position and a burn-out is the result.

The object of my invention is to provide means for cutting a motor out from circuit when the current exceeds a predetermined limit, for automatically cutting out the motor and setting the rheostat in starting position when the circuit is broken or the generator stops, for automatically cutting the motor out of circuit and placing the rehostat in starting position if the motor should be overloaded or the load thrown off too quickly, and generally for automatically taking care of the current delivered to the motor.

My invention consists in the combinations and arrangement of mechanism and circuits hereinafter described and claimed.

Figure 1:
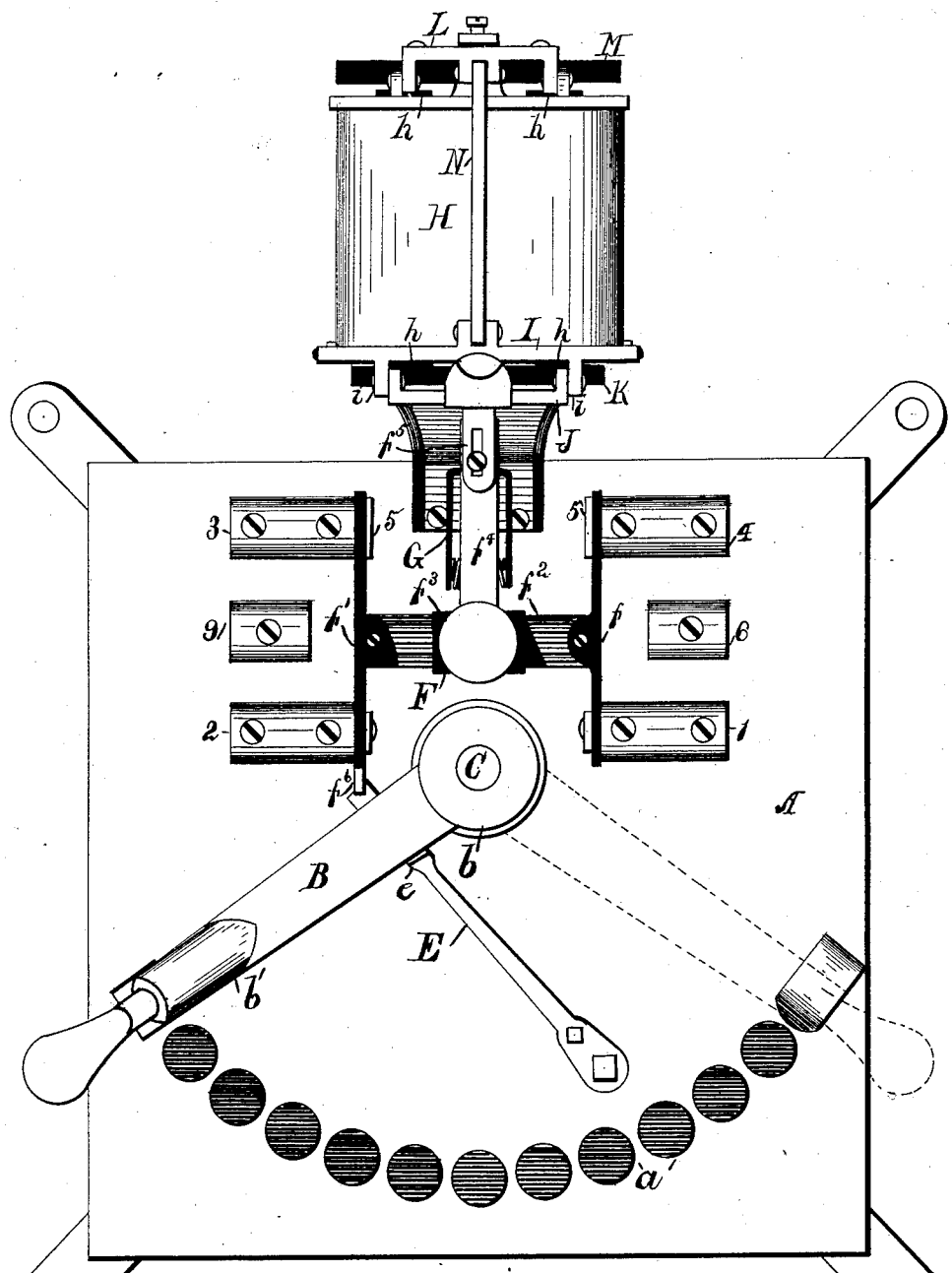
Figure 5:
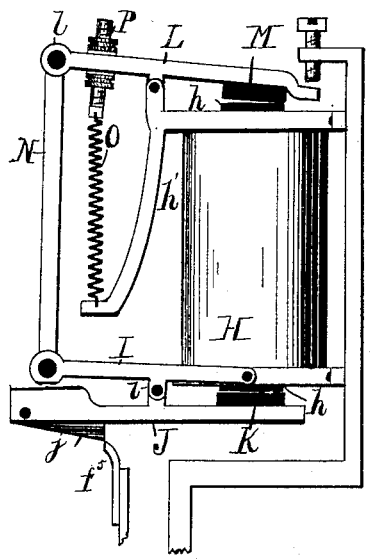
Figure 6:
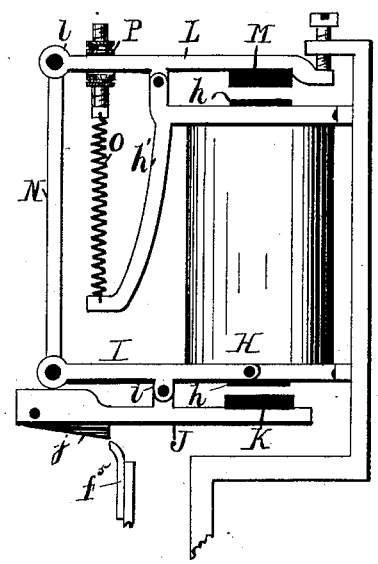

In the drawings, Figure 1 is a front elevation of my device; Fig. 2, a side elevation; Fig. 3, an enlarged vertical section of a rheostat-arm; Fig. 4, a sectional plan of a portion of the rheostat-arm; Fig. 5, a view showing the release magnets and levers in one position; Fig. 6, a like view showing the levers in a different position, and Fig. 7 a conventional view of the wiring. Fig. 2 shows the position of the levers when running. Fig. 5 shows the position when released for overload. Fig. 6 shows the position of the levers when the circuit is broken or the motor is at rest.

A represents a rheostat having a series of contacts $a$, forming terminals for a series of resistance-coils. The contacts are arranged on an arc having as its center the pivot C of a swinging arm B.

The arm B preferably consists of a cylindrical head $b$ and an extension $b'$, forking at its outer end, one part forming a contact adapted to co-operate with the contacts $a$ and the other forming a handle for operating the arm. Mounted within the head $b$ is a spring D, having one end fastened to the head and the other to the arbor or pivot C. This spring normally forces the arm to the starting position. (Shown in dotted lines in Fig. 1.) When the arm is in the starting position, the current passing to the motor must pass through the entire resistance in the rheostat. As the arm is moved over each successive contact-point the resistance is cut out of the circuit until the arm reaches its full swing, when the resistance is entirely cut out. The arm is held in this position by a spring-arm E, having a shoulder $e$, which takes against the edge of the arm. By pressing the spring E the arm will be released from engagement with the shoulder $e$, and will be returned to its initial position by pressure of the coiled spring D.

A two-pole cut-out switch F is pivoted to binding-blocks 1 and 2, insulated from each other by the non-conducting face of the rheostat, and is adapted to swing into engagement with binding-blocks 3 and 4, mounted on the face of the rheostat and provided with split spring-contact ends 5. The switch F preferably consists of two conducting-plates $f$ and $f'$, connected by a block of insulating material $f^2$, which carries an operating-handle $f^3$. Extending from this block $f^2$ is an arm $f^4$, having at its end a catch $f^5$, preferably adjustable to compensate for wear.

Extending from one of the conducting-plates is a lug $f^6$, adapted to engage with and actuate spring E. A spring G, secured to the rheostat, presses against arm $f^4$ and tends to throw the switch out of contact with binding-blocks 3 and 4. The stress of the spring is greater than the gripping-force of the split-spring contacts 5, so that the switch will normally be thrown out of engagement with binding-blocks 3 and 4, unless held by some external force.

Mounted above switch F is a two-bar electromagnet H, provided with cores $h$, extending at each end thereof. A U-shaped lever I is pivoted to the lower end of the electromagnets H and carries downwardly-projecting lugs $i$, which form pivotal points for a lever J, carrying at the end adjacent to the lower ends of cores $h$ an armature K, and at the other end a latch $j$, adapted to take over catch $f^5$ when the armature K is drawn up by the force exerted by the electromagnets H. The lever J is so pivoted as to have the preponderance of weight upon the side carrying the armature, and the tendency is for latch $j$ to be lifted out of the way of catch $f^5$. Pivotally mounted above the upper ends of cores $h$ is another lever L, carrying an armature M above the cores and having an arm $l$, connected with lever I by a link N.

A tension-spring O is secured to an arm $h'$, extending from electromagnets H and to an adjusting-screw P, passing through arm $l$ of lever L. The tension of spring O may be regulated to prevent the operation of levers for the overload before the predetermined pressure of current is reached. If the armature M is brought down, arm $l$ of lever L will be raised. Lever I will also be raised by means of the connecting-link N, thereby raising the pivot $i$, drawing-lever J, and latch $j$ out of engagement with catch $f^5$, thereby releasing the switch and allowing the switch to drop into the position shown in dotted lines in Fig. 2.

The electrical connections are as follows: The line enters binding-block 6 and passes through the release-magnet coils, binding-block 4, and switch-arm $f$ to block 1. The armature-circuit comes from block 1, through wire 7, to the positive brush, through the armature to the negative brush, by wire 8 to binding-block 9, thence to the resistance in the rheostat, through the rheostat-arm to binding-block 2, through switch-arm $f'$ to block 3, and out to the line, thus completing the circuit. The field-circuit comes from block 1, through wire 10, through field-coils to binding-block 2, by switch-arm $f'$ to binding-block 3, and out to the line, thus completing the field-circuit.

Suppose the switch thrown down, as shown in dotted lines in Fig. 2, and the rheostat in starting position. To start the motor, the operator throws the switch in contact with the blocks 3 and 4, thus completing the circuit. As this is done catch $f^5$ passes below and back of the latch $j$. The current now passing to the motor is slight, as it passes through all the resistance of the rheostat, but is sufficient to energize the electromagnets, and the armature is drawn upward, thus bringing latch $j$ into a position of engagement with catch $f^5$, which prevents the switch from being thrown by spring G and breaking the circuit. The rheostat-arm is now moved over the contacts $a$, the resistance gradually cut out, and the pressure of current going to the motor increased. When the rheostat-arm reaches its limit of swing, the spring E holds it against retrograde movement, the resistance is cut out, and the motor receives the current direct. Since all the current passes around the magnet-cores $h$, the armature K is held to the cores with greater force as the resistance is cut out. Should the current suddenly stop, the cores are no longer excited, and there is no attraction between them and the armature K. On account of the proportioning of the arms of lever J, the arm-carrying latch $j$ raises and catch $f^5$ is released. Spring G throws the switch open and breaks the circuit. The lug $f^6$ on the switch strikes spring E, lowers shoulder $e$, and releases the rheostat-arm, and the coiled spring D returns the arm to the initial or starting position.

If the switch and rheostat are in running position, the two cores of the electromagnets will be magnetically connected by armature K and the electromagnet converted into a horseshoe-magnet. If the current gets up to or above the limit, armature M is attracted by the horseshoe-magnet, arm $l$ of lever L is raised, drawing with it lever I by means of link N, thus raising pivot $i$, lever J, and latch $j$, which releases catch $f^5$, and spring G throws the switch open, thus breaking the line and releasing the rheostat-arm, which is returned to its starting position by spring D.

I claim as my invention—

1. The combination with an electric motor of a cut-out switch of an electro-magnet, having its core projecting at both ends, and forming two poles adapted to co-operate with two independently mounted armatures and release the cut-out switch when abnormally increased or abnormally decreased current energizes the magnet.

2. The combination with an electric motor of a cut out switch; an electro-magnet in series with the motor; an armature adjacent to one end of the magnet adapted to co-operate therewith and release the cut-out switch when a current less than a predetermined minimum energizes the electro-magnet, and an armature at the other end of the magnet adapted to co-operate therewith and release the switch when a current of a predetermined maximum energizes the electro-magnet.

3. The combination with an electric motor of a spring-actuated cut out switch; an electro-magnet in series with the motor; an armature adjacent to one end of the magnet adapted to co-operate therewith and release the cut out switch when a current less than a predetermined minimum energizes the electro-magnet, and an armature at the other end of the magnet adapted to co-operate therewith and release the switch when a current of a predetermined maximum energizes the electro-magnet.

4. The combination, with an electric motor, of a cut out switch; an electro-magnet in series with the motor; an armature adjacent to one end of the magnet adapted to co-operate therewith and release the cut out switch when a current less than a predetermined minimum energizes the electro-magnet, and an armature at the other end of the magnet adapted to co-operate therewith and release the switch when a current of a predetermined maximum energizes the electro-magnet; a rheostat; and means for automatically returning the rheostat to starting position when the switch is operated.

5. The combination, with an electric motor, of a cut out switch; an electro-magnet in series with the motor; an armature adjacent to one end of the magnet adapted to co-operate therewith and release the cut out switch when a current less than a predetermined minimum energizes the electro-magnet; an armature at the other end of the magnet adapted to co-operate therewith and release the switch when a current of a predetermined maximum energizes the electro-magnet; a rheostat; a catch adapted to hold the rheostat in running position; a projection on the cut out switch adapted to release the catch, and means for automatically returning the rheostat to starting position.

6. The combination with an electric motor of a cut out switch; an electro magnet in series with the motor; a lever carrying at one end a latch and at the other an armature adjacent to one end of the electro-magnet; and a lever carrying an armature adjacent to the other end of the electro-magnet and connected with the first lever substantially as and for the purpose set forth.

7. The combination, with an electric switch, of a double electro-magnet having cores at each end; an armature at one end adapted to magnetically connect the cores, thereby converting the double magnet into a horse shoe magnet; and lever connections between the armature at the other end and the switch whereby the latter is released when the armature is actuated, substantially as and for the purpose set forth.

8. The combination, with an electric switch, of a double electro-magnet, having cores at each end; an armature at one end adapted to magnetically connect the cores, thereby converting the double magnet into a horse shoe magnet; lever connections between the armature at the other end and the switch whereby the latter is released when the armature is actuated, and means for automatically throwing the switch; substantially as and for the purpose set forth.

9. The combination, in an electric safety switch, of a two poled switch arm; a catch thereon; a double electro magnet having cores at each end; a lever carrying an armature adapted to magnetically connect the cores; a latch, carried by the lever, adapted to engage with the catch on the switch, a second lever carrying an armature, and connections between the lever and the latch whereby the latch will be lifted out of engagement with the catch when the current reaches a predetermined maximum, substantially as and for the purpose set forth.

10. The combination, in an electric safety switch, of a rheostat; a spring arm adapted to hold the rheostat arm in its "on" position; a spring adapted to return the rheostat arm to its starting position; an automatic switch, and a lug on the switch adapted to release the spring which holds the rheostat arm, substantially as and for the purpose set forth.

11. The combination in an electric safety switch of a two pole switch arm, F; a catch, $f^5$, carried thereby; an electro-magnet, H; a lever, J, carrying an armature, K, and latch, $j$; a lever, I; a lever, J, fulcrumed thereon; a lever L, carrying an armature, M; a link, N, connecting levers, L and I, and a spring, G, for throwing the switch, substantially as and for the purpose set forth.

12. The combination in an electric safety switch of a two pole arm, F; a catch, $f^5$, carried thereon; an electro-magnet, H; a lever, J, carrying an armature, K, and latch $j$; a lever, I; a lever, J, fulcrumed thereon; a lever, L, carrying an armature M; a link, N; connecting levers, L and I; a spring G, for throwing the switch; a rheostat arm, B, held in running position by spring, E, and a projection, $f^6$, on the switch, adapted to release spring, E, from arm, B, substantially as and for the purpose set forth.

GEO. F. CARD.

Witnesses:
REID CARPENTER,
B. F. CRAWFORD.